(12) United States Patent
Anania et al.

(10) Patent No.: US 10,703,511 B2
(45) Date of Patent: Jul. 7, 2020

(54) ATTITUDE CONTROL FOR AGILE SATELLITE APPLICATIONS

(71) Applicant: THALES ALENIA SPACE ITALIA S.p.A. CON UNICO SOCIO, Rome (IT)

(72) Inventors: Marco Anania, Rome (IT); Domenico Cascone, Rome (IT)

(73) Assignee: THALES ALENIA SPACE ITALIA S.P.A. CON UNICO SOCIO, Rome (IT)

(*) Notice: Subject to any disclaimer, the term of this patent is extended or adjusted under 35 U.S.C. 154(b) by 1012 days.

(21) Appl. No.: 15/107,419

(22) PCT Filed: Dec. 23, 2014

(86) PCT No.: PCT/IB2014/067282
§ 371 (c)(1),
(2) Date: Jun. 22, 2016

(87) PCT Pub. No.: WO2015/097672
PCT Pub. Date: Jul. 2, 2015

(65) Prior Publication Data
US 2017/0029139 A1    Feb. 2, 2017

(30) Foreign Application Priority Data

Dec. 23, 2013   (IT) .............................. TO2013A1067

(51) Int. Cl.
| | |
|---|---|
| *B64G 1/28* | (2006.01) |
| *B64G 1/24* | (2006.01) |
| *B64G 1/10* | (2006.01) |
| *G01C 19/06* | (2006.01) |

(52) U.S. Cl.
CPC ............... *B64G 1/286* (2013.01); *B64G 1/10* (2013.01); *B64G 1/244* (2019.05); *G01C 19/065* (2013.01)

(58) Field of Classification Search
CPC ........ B64G 1/286; B64G 1/288; B64G 1/285; B64G 1/283
See application file for complete search history.

(56) References Cited

U.S. PATENT DOCUMENTS

| | | | |
|---|---|---|---|
| 1,380,336 A | | 5/1921 | Paxton |
| 3,251,955 A | * | 5/1966 | Erickson ................ G01C 19/10 191/12 R |

(Continued)

FOREIGN PATENT DOCUMENTS

EP    1908686    4/2008

OTHER PUBLICATIONS

PCT International Search Report and Written Opinion for PCT/IB2014/067282 dated Jun. 19, 2015.

*Primary Examiner* — Richard R. Green
(74) *Attorney, Agent, or Firm* — McCarter & English, LLP

(57) ABSTRACT

The present invention relates to attitude control and, in particular, to control of the attitude of a space platform. The space platform may take the form of or be part of a satellite and/or a spacecraft. An aspect of the present invention concerns the use, in an attitude control system, of several control moment gyroscopes with limited gimbal revolutions. Another aspect of the present invention concerns an improved logic for controlling a control moment gyroscope assembly of an attitude control system.

12 Claims, 11 Drawing Sheets

(56) References Cited

U.S. PATENT DOCUMENTS

| | | |
|---|---|---|
| 7,249,531 B2 * | 7/2007 | Defendini ............ B64G 1/286 74/5.47 |
| 2003/0160132 A1 | 8/2003 | Osterberg et al. |
| 2003/0188592 A1 | 10/2003 | Hyde et al. |
| 2004/0167683 A1 | 8/2004 | Lagadec et al. |
| 2009/0001220 A1 | 1/2009 | Peck et al. |
| 2009/0200428 A1 | 8/2009 | Smith et al. |
| 2011/0011982 A1 | 1/2011 | Herman et al. |
| 2012/0199697 A1 | 8/2012 | Nagabhushan |
| 2013/0199308 A1 | 8/2013 | Fitz-Coy |

* cited by examiner

ATTITUDE CONTROL FOR AGILE SATELLITE APPLICATIONS

TECHNICAL FIELD OF THE INVENTION

The present invention relates, in general, to attitude control and, in particular, to control of the attitude of a space platform, conveniently of a satellite and/or a spacecraft.

STATE OF THE ART

As is known, a Control Momentum (or Moment) Gyroscope (or Gyro) (that, in the following, will be referred to as CMG) is a torque generator used for attitude control, in particular in spacecraft/satellite attitude control systems. Usually it is used in place of the reaction wheels for its high output torque and rapid response.

In this respect, FIG. 1 schematically illustrates, by way of example, the working principle of a CMG (denoted as a whole by 1) exploitable for satellite attitude control.

In particular, as shown in FIG. 1, the CMG 1 comprises a flywheel, or rotor, (schematically represented as a disc 11) housed in a casing 12 and spun at constant angular velocity by a flywheel motor (not shown in FIG. 1 for the sake of illustration simplicity) thereby having an angular momentum H.

The flywheel 11 is coupled with a gimbal (not shown in FIG. 1 for the sake of illustration simplicity) operable by a gimbal motor (not shown in FIG. 1 for the sake of illustration simplicity) to rotate said flywheel 11 and, thence, its angular momentum vector H about a gimbal axis G perpendicular to the angular momentum vector H, thereby generating a gyroscope (or gyro-effect) torque T which can be used to rotate a satellite. The generated torque T lies on an axis perpendicular to both the rotor angular momentum vector H and the gimbal axis G, and rotates about the gimbal axis G with the same angular velocity with which the rotor 11 is rotated by the gimbal about said gimbal axis G.

Use of Control Moment Gyros (CMGs) in spacecraft/satellite attitude control systems has been limited for several years due to peculiarity of this type of actuators. In fact, CMGs are complex electromechanical units based on mechanical gimbals allowing infinite number of revolutions; their joints shall support high rotational speeds and extraordinary accelerations during actuation start and stop phases. Moreover, they are based on slip-ring systems, which increase costs and reduce reliability of the overall system.

Since the torque produced by a CMG rotates in a plane orthogonal to the gimbal axis, an assembly or cluster including several CMG units is usually required to control the desired torque in a plane or in the three-dimensional space. In this respect, attention is drawn to the fact that the terminologies "CMG cluster" and "CMG assembly" will be used indifferently in the present application.

The configuration of a CMG cluster is usually defined by the directions of all the CMG units, in particular by the directions of the gimbal axes.

As is known, typical single gimbal CMG assemblies (i.e., with one gimbal per rotor) normally have certain types of symmetries, which can be classified into two main types: independent type and multiple type. In particular, a single gimbal CMG assembly of the independent type has not parallel gimbal directions/axes, while a single gimbal CMG assembly of the multiple type has groups of parallel gimbal directions/axes.

In this respect, FIG. 2 schematically illustrates a single gimbal CMG cluster of the multiple type (denoted as a whole by 2) comprising six single gimbal CMGs (i.e., wherein each CMG has a single gimbal). In particular, in FIG. 2, for the sake of illustration simplicity, only the rotors of the six single gimbal CMGs are shown. In detail, as shown in FIG. 2, three rotors (denoted by 21, 22 and 23, respectively) and, thence, the corresponding three CMGs have first gimbal directions/axes (denoted by $\hat{g}_{21}$, $\hat{g}_{22}$ and $\hat{g}_{23}$, respectively) which are mutually parallel, while the other three rotors (denoted by 24, 25 and 26, respectively) and, thence, the other three CMGs have second gimbal directions/axes (denoted by $\hat{g}_{24}$, $\hat{g}_{25}$ and $\hat{g}_{26}$, respectively) which are mutually parallel and which are not parallel to the first gimbal directions/axes $\hat{g}_{21}$, $\hat{g}_{22}$ and $\hat{g}_{23}$.

Moreover, the rotors 21, 22 and 23 have the angular momentum vectors (denoted by $h_{21}$, $h_{22}$ and $h_2$, respectively) rotating in one and the same plane, and the rotors 24, 25 and 26 have the angular momentum vectors (denoted by $h_{24}$, $h_{25}$ and $h_{26}$, respectively) rotating in one and the same plane that is parallel to the plane in which the angular momentum vectors $h_{21}$, $h_{22}$ and $h_{23}$ of the rotors 21, 22 and 23 rotate.

An example of CMG cluster is disclosed in US 2011/011982 A1, which relates to a modular CMG system for a spacecraft attitude control system, which modular CMG system is formed by a plurality of CMG modules, wherein each CMG module has a modular enclosure design that is identical to that of the other CMG modules, such that the plurality of CMG modules are mountable in a spacecraft array bus structure in any desired one of multiple array configurations.

Moreover, US 2003/160132 A1 discloses a dynamic unbalance compensation system compensating for dynamic unbalance of a rotating assembly on a spacecraft to compensate for the presence of a dynamic unbalance moment. In particular, said dynamic unbalance compensation system according to US 2003/160132 A1 includes a spacecraft, a rotational assembly mounted on the spacecraft and rotatable about an axis of rotation relative to the spacecraft, and one or more momentum devices mounted on the rotational assembly and generating a momentum vector component perpendicular to the axis of rotation. The one or more momentum devices generate a compensation torque during spinning of the rotational assembly so as to compensate for dynamic unbalance of the rotational assembly.

The most important drawback of CMG clusters is that there exist some conditions in which the CMGs are not able to produce torque along certain directions, which are called singularity directions. A CMG cluster approaches a singularity direction when it reaches a particular gimbal angle geometric configuration. Therefore, ad hoc singularity avoidance logics have to be chosen, with different advantages and disadvantages, in order to mitigate the effects of this problem.

In the past several CMG control techniques have been proposed and implemented to avoid singularity conditions, such as:
 offline optimizations performed a priori on ground to compute offline gimbal trajectories such that to meet mission requirements and, at the same time, to avoid singularity conditions; or
 singularity avoidance techniques introducing errors/disturbances into the actuated torque.

An example of hierarchical strategy for singularity avoidance in arrays of CMGs is disclosed in EP 1 908 686 A1, which relates to a control system for adjusting the attitude of a spacecraft, which control system comprises:

a set of CMGs configured to allow null space maneuvering; and a momentum actuator control processor coupled to the set of CMGs and configured to determine a mandatory null space maneuver to avoid singularities, and determine an optional null space maneuver to increase available torque.

In particular, said mandatory null space maneuver can be calculated based upon certain gimbal angles, and can be implemented by augmenting the inverse-Jacobian control matrix.

OBJECT AND SUMMARY OF THE INVENTION

Therefore, a first object of the present invention is that of providing an attitude control system which has lower complexity and, thence, lower costs, and, at the same time, higher reliability and stability than known attitude control systems.

Moreover, a second object of the present invention is that of providing an attitude control system with improved singularity avoidance capabilities.

These and other objects are achieved by the present invention in that it relates to a Control Moment Gyroscope assembly, an attitude control unit and an attitude control system, as defined in the appended claims.

BRIEF DESCRIPTION OF THE DRAWINGS

For a better understanding of the present invention, preferred embodiments, which are intended purely by way of non-limiting examples, will now be described with reference to the attached drawings (all not to scale), wherein.

DETAILED DESCRIPTION OF PREFERRED EMBODIMENTS OF THE INVENTION

Figure 1:
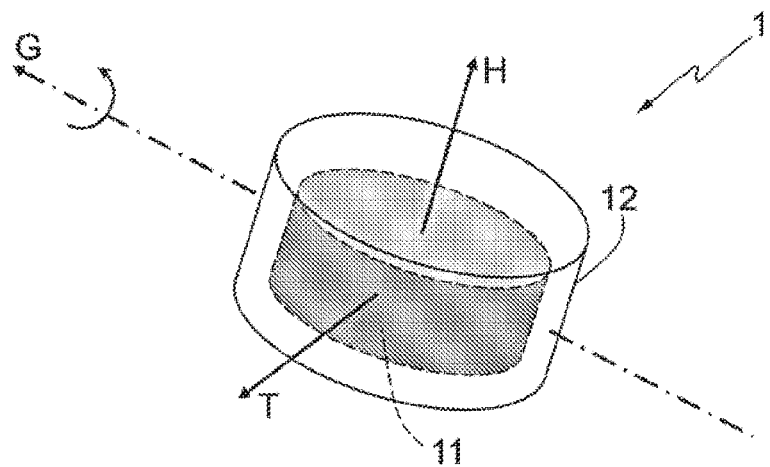
FIG. 1 schematically illustrates the working principle of a Control Momentum Gyroscope.
Figure 2:
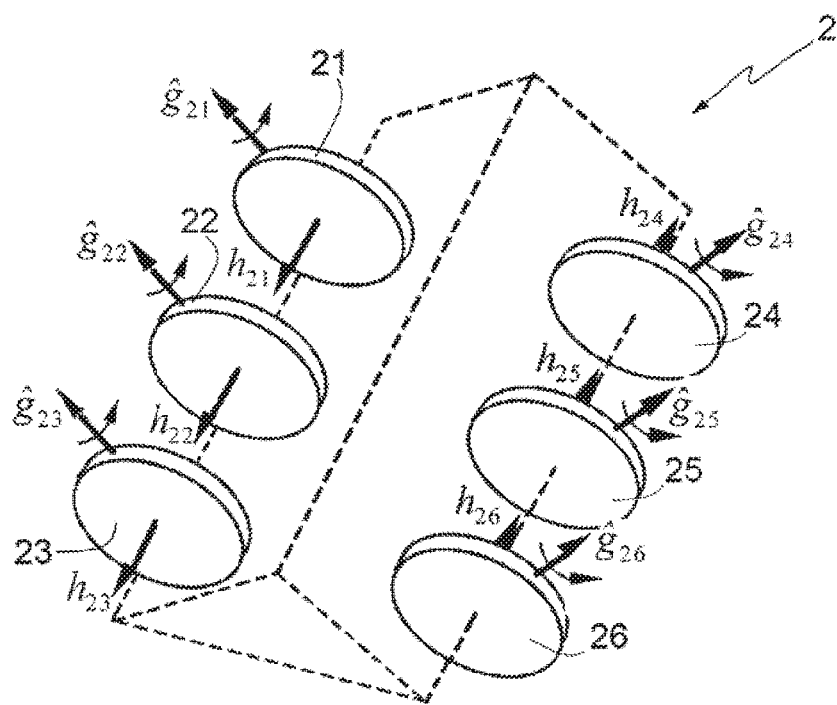
FIG. 2 schematically illustrates a Control Momentum Gyroscope cluster of the multiple type.

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown and described, but is to be accorded the widest scope consistent with the principles and features disclosed herein and defined in the appended claims.

The present invention relates, in general, to attitude control and, in particular, to control of the attitude of a space platform, conveniently of a satellite and/or a spacecraft.

In detail, a first aspect of the present invention concerns the use, in an attitude control system, of several CMGs with limited gimbal revolutions, a second aspect of the present invention concerns a specific configuration of a CMG assembly for an attitude control system, and a third aspect of the present invention concerns a specific logic for controlling a CMG assembly of an attitude control system. The synergetic combination of the aforesaid three aspects of the present invention allows to realize a new and inventive attitude control system which overcomes all the main problems (previously described) related to the use of CMGs.

Anyway, without prejudice to the foregoing, it is important to note that each of the aforesaid three aspects of the present invention allows, per se, to achieve respective important technical advantages and, thence, to realize a new and inventive attitude control system even not in combination with the other two aspects. In particular, the use of CMGs with limited gimbal revolutions according to the first aspect allows, per se, to realize a new and inventive attitude control system even without the use of the specific CMG assembly configuration according to the second aspect and of the specific CMG assembly control logic according to the third aspect. Moreover, the use of the specific CMG assembly configuration according to the second aspect allows, per se, to realize a new and inventive attitude control system even without the use of CMGs with limited gimbal revolutions according to the first aspect and of the specific CMG assembly control logic according to the third aspect. Finally, the use of the specific CMG assembly control logic according to the third aspect allows, per se, to realize a new and inventive attitude control system even without the use of CMGs with limited gimbal revolutions according to the first aspect and of the specific CMG assembly configuration according to the second aspect.

In particular, as for the first aspect of the present invention, this aspect relates to the use, in an attitude control system, of several CMGs (or CMG units) each of which has a respective gimbal mechanically constrained so as to be operable to perform only a limited number of (clockwise and counterclockwise) full revolutions on its axis.

In detail, as is known and as previously described, in a CMG a flywheel motor is used to rotate the flywheel (or rotor) on its axis, which flywheel motor is usually arranged on the gimbal. Therefore, in a CMG electrical connections between fixed and rotating parts have to be provided to feed the flywheel motor (in particular, to feed flywheel motor's phases) and to get signals from sensors coupled with the rotor. According to the first aspect of the present invention this is accomplished by means of a flexible cable, preferably a flat flexible cable, which, in response to gimbal's rotation, is rolled and unrolled (i.e., coiled and uncoiled) round the gimbal axis and which ensures power and signal connection to/from the CMG. Due to the use of the aforesaid flexible cable, the maximum number of gimbal revolutions depends on the length of the flexible cable used, which, thence, represents a mechanical constraint for the number of full revolutions performable clockwise and counterclockwise by the gimbal on its axis. In fact, if this limit is exceeded, the CMG unit fails since the power and signal connection is interrupted.

Figure 3:
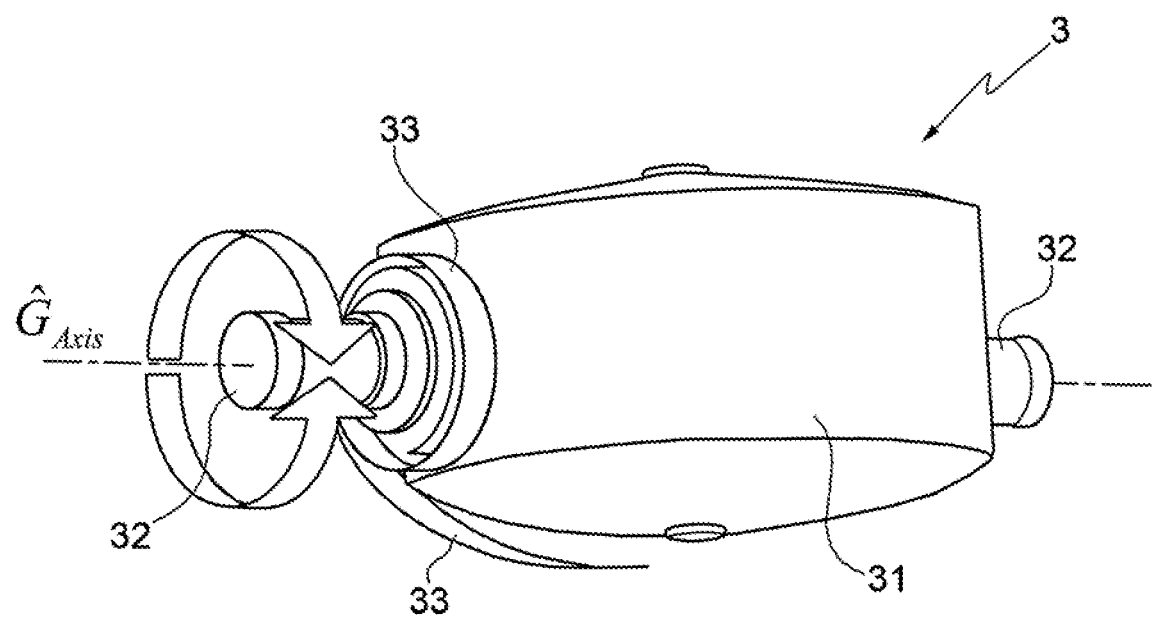
FIG. 3 schematically illustrates a Control Momentum Gyroscope according to a preferred embodiment of a first aspect of the present invention.

For a better understanding of the first aspect of the present invention, reference is made to FIG. 3 that schematically illustrates a CMG (denoted as a whole by 3) according to a preferred embodiment of said first aspect of the present invention.

In particular, the CMG 3 comprises:
a casing 31 that houses, on its inside, a flywheel spun on a flywheel axis by a flywheel motor (said flywheel, flywheel axis and flywheel motor being not visible in FIG. 3); and
a gimbal 32, which
extends inside the casing 31 and protrudes also externally from the latter, and
is rotatable clockwise and counterclockwise on a gimbal axis $\hat{G}_{Axis}$ and is coupled with the flywheel to cause the latter to rotate clockwise and counterclockwise about said gimbal axis $\hat{G}_{Axis}$.

Moreover, as shown in FIG. 3, a flexible cable, preferably a flat flexible cable, 33 is coupled to the gimbal 32, externally to the casing 31, to feed, in general, the CMG 3 and, in particular, the flywheel motor inside the casing 31, and to receive signals provided by sensors coupled, in general, to the CMG 3 and, in particular, to said flywheel.

In particular, in use, gimbal rotation causes the flexible cable 33 to be rolled and unrolled (i.e., coiled and uncoiled) round the gimbal 32, thereby mechanically limiting the number of full revolutions performable clockwise and counterclockwise by said gimbal 32 on the gimbal axis $\hat{G}_{Axis}$.

The first aspect of the present invention provides several advantages. In particular, it allows to avoid the use of slip-rings or roll-rings for transferring power and signals to/from the CMG with consequent positive impacts in terms of costs of the unit qualification process and of system reliability and endurance in the space environment. Conveniently, the proposed solution is based on flexible cables, preferably flat flexible cables, namely power and signal transmission elements which do not use moving parts and which have better reliability, stability and electromagnetic noise resistance.

Moreover, thanks to the use of CMGs with limited gimbal revolutions, the gimbal sensor design and management can be simplified since it is not requested to measure infinite gimbal angle revolutions. This fact allows the use of sensor types (e.g., sensors providing analog outputs of the sine/cosine type) with simplified angle reconstruction algorithms and thus permits to have positive impacts on costs and system reliability.

In consideration of the aforesaid technical advantages related to the first aspect of the present invention, it can be easily understood that, as already previously explained, the use of CMGs with limited gimbal revolutions allows, per se, to realize a new and inventive attitude control system (even without the additional features according to the second and third aspects of the present invention). In this respect, it is important to stress the point that the first aspect of the present invention can be advantageously exploited also in an attitude control system that:
has a CMG cluster with a configuration different than the one according to the second aspect of the present invention; and/or
implements a CMG cluster control logic different than the one according to the third aspect of the present invention.

Furthermore, as for the second aspect of the present invention, this aspect relates to the use, in an attitude control system, of a cluster of several CMGs divided into two groups, namely a first and a second group, wherein:
the CMGs of the first group have
the gimbal axes that are mutually parallel or lie along one and the same straight line, and
the rotor angular momentum vectors rotating in one and the same plane or in parallel planes;
the CMGs of the second group have the gimbal axes that are mutually parallel or lie along one and the same straight line, and
are not parallel to the gimbal axes of the CMGs of the first group;
the CMGs of the second group have the rotor angular momentum vectors rotating in one and the same plane or in parallel planes; and
the plane(s) in which the rotor angular momentum vectors of the CMGs of the first group rotate intersect the plane(s) in which the rotor angular momentum vectors of the CMGs of the second group rotate.

Conveniently, the gimbal axes of the CMGs of the first group and of the second group lie on one and the same plane.

Preferably, the CMG cluster comprises three or more CMGs; for example the CMG cluster can conveniently comprise four CMGs.

Conveniently, the CMGs of the first group and of the second group have limited gimbal revolutions according to the first aspect of the present invention.

Figure 4:
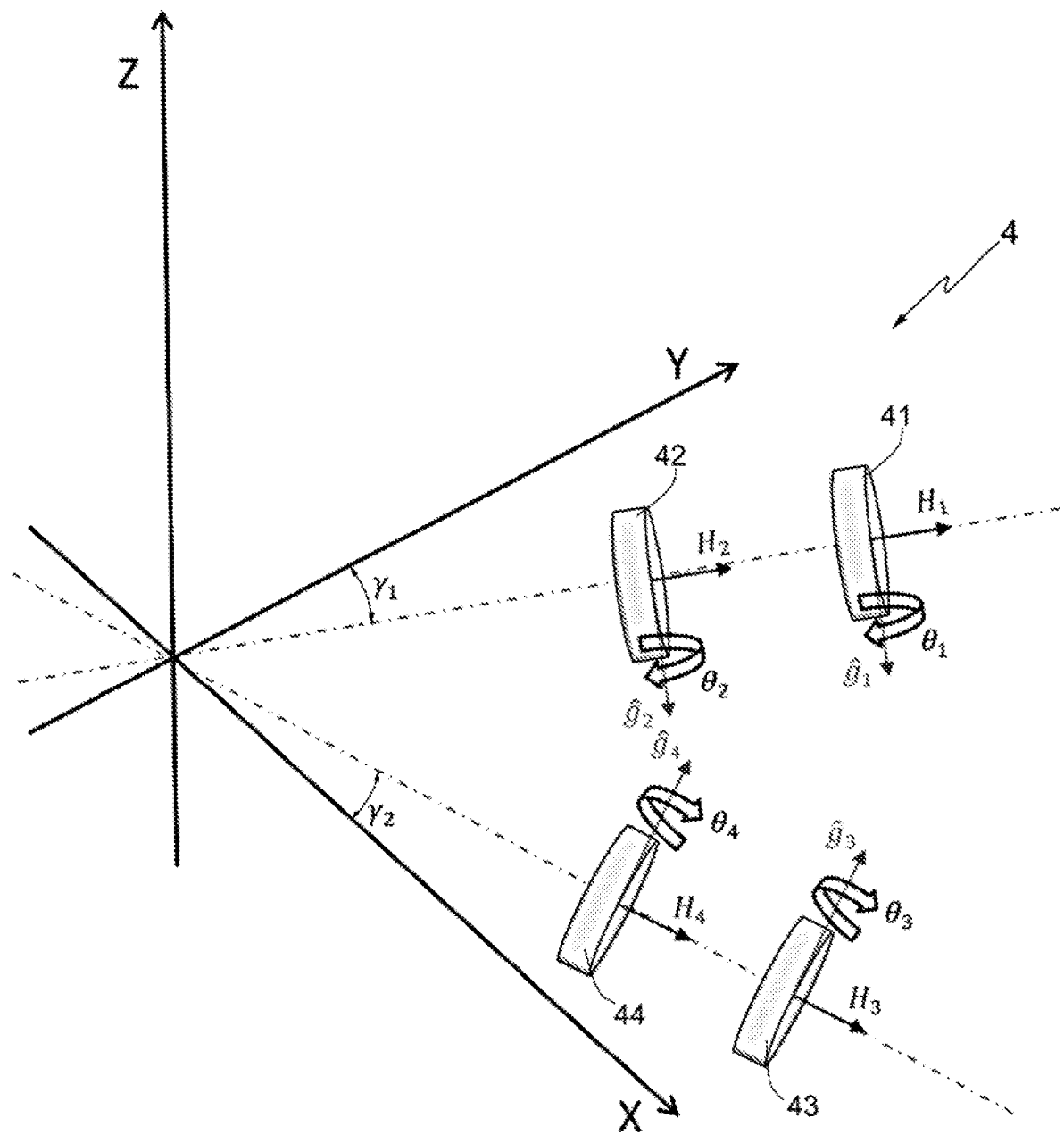
FIG. 4 schematically illustrates a Control Momentum Gyroscope cluster according to a first preferred embodiment of a second aspect of the present invention.

For a better understanding of the second aspect of the present invention, FIG. 4 schematically illustrates a first configuration of a first CMG cluster (denoted as a whole by 4) for an attitude control system according to a first preferred embodiment of the aforesaid second aspect of the present invention.

In particular, the CMG cluster 4 includes four CMGs 41, 42, 43 and 44 (for the sake of illustration simplicity, in FIG. 4 only the rotors of the four CMGs 41, 42, 43 and 44 are shown), which are divided into two pairs, namely a first and a second pair, wherein each pair of CMGs have parallel gimbal axes (thereby resulting that the CMG cluster 4 is a CMG cluster of the multiple type).

In detail, as shown in FIG. 4, the CMGs 41 and 42 have:
parallel gimbal axes $\hat{g}_1$ and $\hat{g}_2$; and
rotor angular momentum vectors $H_1$ and $H_2$ rotating in one and the same plane.

Moreover, the CMGs 43 and 44 have:
parallel gimbal axes $\hat{g}_3$ and $\hat{g}_4$, which are not parallel to the gimbal axes $\hat{g}_1$ and $\hat{g}_2$ of the CMGs 41 and 42, and which lie on the same plane as the gimbal axes $\hat{g}_1$ and $\hat{g}_2$ of the CMGs 41 and 42 (said plane common to the gimbal axes $\hat{g}_1$, $\hat{g}_2$, $\hat{g}_3$ and $\hat{g}_4$ being represented in FIG. 4 by a plane XY of a three-dimensional Cartesian reference system XYZ shown in said figure); and
rotor angular momentum vectors $H_3$ and $H_4$ rotating in one and the same plane that intersects the plane in which the rotor angular momentum vectors $H_1$ and $H_2$ of the CMGs 41 and 42 rotate.

Furthermore, the plane in which the rotor angular momentum vectors $H_1$ and $H_2$ of the CMGs 41 and 42 rotate forms an angle $\gamma_1$ with the axis Y, and the plane in which the rotor angular momentum vectors $H_3$ and $H_4$ of the CMGs 43 and 44 rotate forms an angle $\gamma_2$ with the axis X.

The total angular momentum $H_{CMG}^4(t)$ provided by the CMG cluster 4 can be expressed as function of the gimbal angles $\theta_i(t)$ of each CMG 41, 42, 43 and 44 by simple trigonometric expressions:

$$H_{CMG}^4(t) = H_{41}(t) + H_{42}(t) + H_{43}(t) + H_{44}(t) = \quad (1)$$

$$= R(\gamma_1) \cdot H_0 \left( \begin{bmatrix} 0 \\ \cos(\theta_1(t)) \\ \sin(\theta_1(t)) \end{bmatrix} + \begin{bmatrix} 0 \\ \cos(\theta_2(t)) \\ \sin(\theta_2(t)) \end{bmatrix} \right) + +$$

$$R(\gamma_2) \cdot H_0 \left( \begin{bmatrix} \cos(\theta_3(t)) \\ 0 \\ \sin(\theta_3(t)) \end{bmatrix} + \begin{bmatrix} \cos(\theta_4(t)) \\ 0 \\ \sin(\theta_4(t)) \end{bmatrix} \right)$$

where $H_0$ denotes the angular momentum of a single CMG unit (in the present example said angular momentum $H_0$ being assumed to be the same for all the CMGs 41, 42, 43 and 44, remaining it clear that the angular momentum of each CMG unit can be also different from the ones of the other CMG units), and $R(\gamma_1)$ and $R(\gamma_2)$ denote rotation matrices that take into account the tilt angle between the two intersecting planes in which the rotor angular momentum vectors $H_1$ and $H_2$, and $H_3$ and $H_4$ respectively rotate.

Thence, the differential of the total angular momentum vector is:

$$dH_{CMG}^4 = H_0(\bar{j}_1 d\theta_1 + \bar{j}_2 d\theta_2 + \bar{j}_3 d\theta_3 + \bar{j}_4 d\theta_4) = A\, d\bar{\theta} \quad (2)$$

where A is the Jacobian matrix defined as $$dH_{CMG}^4(t) = H_0 \begin{bmatrix} 0 & 0 & -\sin(\theta_3(t)) & -\sin(\theta_4(t)) \\ -\sin(\theta_1(t)) & -\sin(\theta_2(t)) & 0 & 0 \\ \cos(\theta_1(t)) & \cos(\theta_2(t)) & \cos(\theta_3(t)) & \cos(\theta_4(t)) \end{bmatrix} d\bar{\theta}. \quad (3)$$

A CMG cluster control logic, in use, has to invert the aforesaid equation (3) in order to find the gimbal angle variation command that causes the CMG cluster 4 to provide the requested angular momentum variation.

From a mathematical point of view, the inversion of the equation (3) can be impossible in case the determinant of the Jacobian matrix A is null; in fact, in this case the equation (3) is not invertible and, thence, it is impossible to obtain a solution. When this condition occurs, there exists a direction in which the CMG system 4 cannot provide the requested torque and this situation is named "singularity condition".

Figure 5:
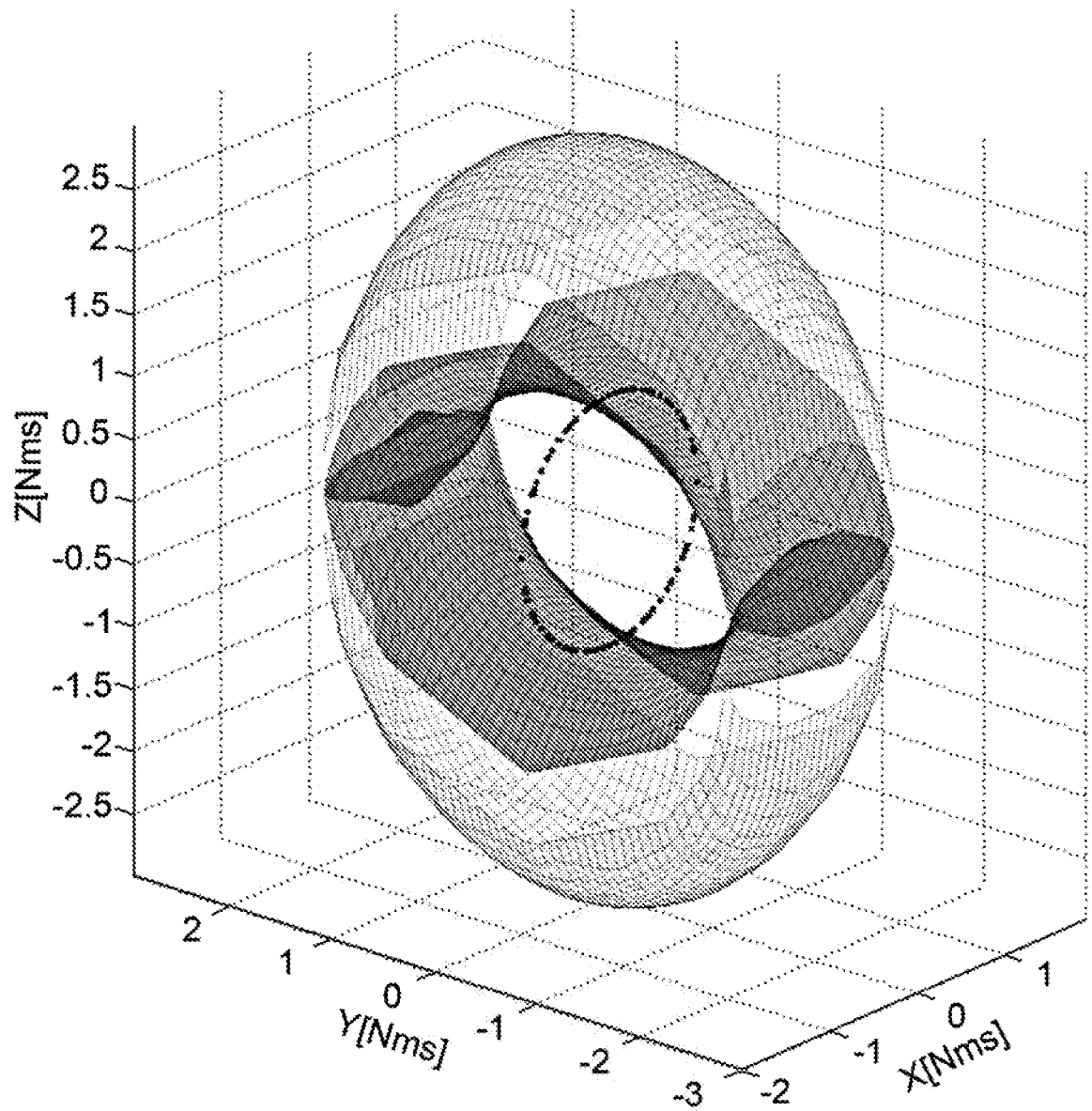
FIG. 5 shows singularity surfaces of three Control Momentum Gyroscopes of the cluster of FIG. 4.

The invention takes advantage of topology of singularities of the proposed configuration in case only three CMGs are used. This CMG configuration has peculiar characteristics in terms of angular momentum availability: it has an angular momentum elliptical envelope, in which no singular conditions occur. This singularity-free region in the envelope of the angular momentum can be approximated as an ellipsoid of radii 1H, 1H, $\sqrt{3}$H. In this respect, FIG. 5 shows singularity surfaces of three used GMCs, namely the angular momentum surfaces where the Jacobian matrix is not invertible. From FIG. 5 an internal region without any singularity surface is evident.

In consideration of the fact that the configuration of the CMG cluster 4 shown in FIG. 4 employs four CMGs, up to four CMG unit triplets (i.e., combinations of three CMG units) can be identified. For each triplet the Jacobian matrix can be calculated. In the following Table 1 the Jacobian matrices of all the CMG triplets (denoted as CONF1, CONF2, CONF3 and CONF4, respectively) are reported for the case $\gamma_1 = \gamma_2 = 0$ (namely, when the planes of rotation of the rotor angular momentum vectors $H_1$ and $H_2$ of the CMGs 41 and 42 and of the rotor angular momentum vectors $H_3$ and $H_4$ of the CMGs 43 and 44 are perpendicular).

TABLE 1

| CMG TRIPLET | JACOBIAN MATRIX |
|---|---|
| CONF1 | $A_{CONF1} = H_0 \begin{bmatrix} 0 & -\sin(\theta_3(t)) & -\sin(\theta_4(t)) \\ -\sin(\theta_2(t)) & 0 & 0 \\ \cos(\theta_2(t)) & \cos(\theta_3(t)) & \cos(\theta_4(t)) \end{bmatrix}$ |
| CONF2 | $A_{CONF2} = H_0 \begin{bmatrix} 0 & -\sin(\theta_3(t)) & -\sin(\theta_4(t)) \\ -\sin(\theta_1(t)) & 0 & 0 \\ \cos(\theta_1(t)) & \cos(\theta_3(t)) & \cos(\theta_4(t)) \end{bmatrix}$ |
| CONF3 | $A_{CONF3} = H_0 \begin{bmatrix} 0 & 0 & -\sin(\theta_4(t)) \\ -\sin(\theta_1(t)) & -\sin(\theta_2(t)) & 0 \\ \cos(\theta_1(t)) & \cos(\theta_2(t)) & \cos(\theta_4(t)) \end{bmatrix}$ |
| CONF4 | $A_{CONF4} = H_0 \begin{bmatrix} 0 & 0 & -\sin(\theta_3(t)) \\ -\sin(\theta_1(t)) & -\sin(\theta_2(t)) & 0 \\ \cos(\theta_1(t)) & \cos(\theta_2(t)) & \cos(\theta_3(t)) \end{bmatrix}$ |

In case the angular momentum request remains in the singularity-free region of the chosen triplet, the gimbal command can be computed directly on the basis of the equation reported in the foregoing Table 1 and corresponding to the chosen triplet by using a simple 3×3 matrix inversion without any singularity problem.

Starting from the relationship between the gimbal angles and the momentum vector, it can be found that the internal angular momentum region can be covered with a limited excursion of the gimbal angles. This characteristic assures that the angular momentum inside the internal singularity-free zone can be explored with a limited variation of the gimbal angles and, thence, this feature optimally matches the use of CMGs with limited gimbal revolutions according to the first aspect of the present invention.

Figure 6:
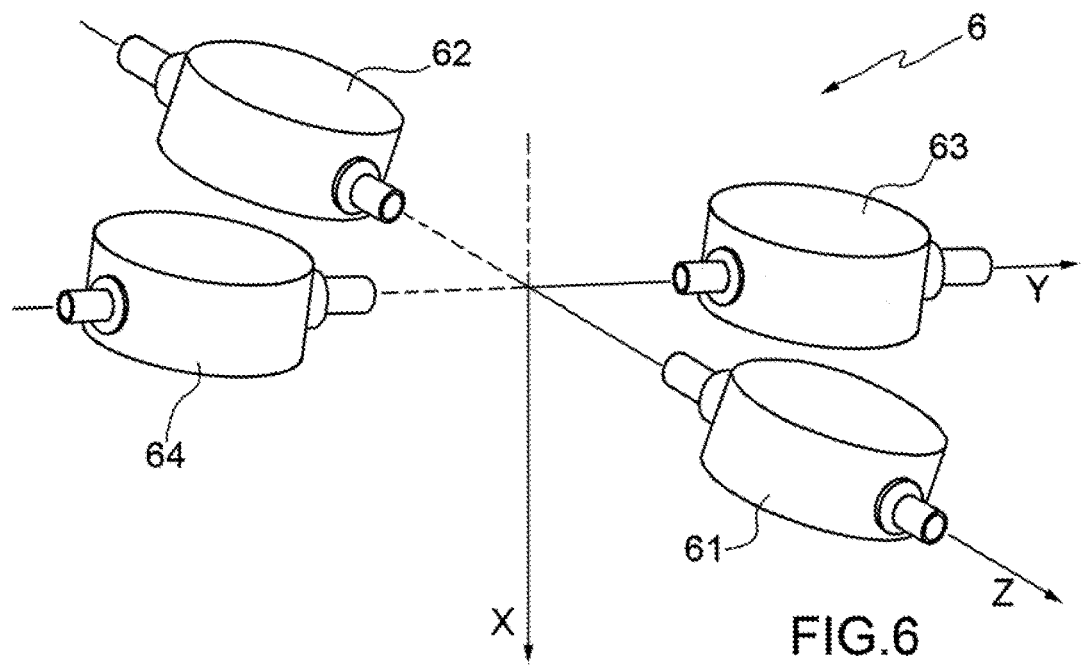
FIG. 6 schematically illustrates a Control Momentum Gyroscope cluster according to a second preferred embodiment of the aforesaid second aspect of the present invention.

As for the use of a CMG cluster configuration in which the rotor angular momentum vectors of the CMGs rotate in perpendicular planes (i.e., the use of a CMG cluster configuration wherein $\gamma_1 = \gamma_2 = 0$), FIG. 6 schematically illustrates a second configuration of a second CMG cluster (denoted as a whole by 6) embodying said feature according to a second preferred embodiment of the second aspect of the present invention.

In particular, the CMG cluster 6 includes four CMGs 61, 62, 63 and 64, which are divided into two pairs, namely a first and a second pair, wherein each pair of CMGs have a respective gimbal axis that is perpendicular to the gimbal axis of the other CMG pair.

In detail, as shown in FIG. 6, the CMGs 61 and 62 have:
one and the same gimbal axis (denoted by an axis z of a three-dimensional Cartesian reference system xyz shown in FIG. 6), or, equivalently, gimbal axes lying along one and the same straight line (i.e., along the axis z); and
rotor angular momentum vectors rotating in parallel planes (in particular, in planes parallel to the plane xy of the three-dimensional Cartesian reference system shown in FIG. 6).

Moreover, the CMGs 63 and 64 have:
one and the same gimbal axis (represented by the axis y of the three-dimensional Cartesian reference system shown in FIG. 6), or, equivalently, gimbal axes lying along one and the same straight line (i.e., along the axis y); and
rotor angular momentum vectors rotating in parallel planes (in particular, in planes parallel to the plane xz of the three-dimensional Cartesian reference system shown in FIG. 6).

Therefore, the gimbal axes of the two CMG pairs 61-62 and 63-64 are perpendicular, and the planes, in which the rotor angular momentum vectors of the CMGs 61 and 62 rotate, intersect and are perpendicular to the planes in which the rotor angular momentum vectors of the CMGs 63 and 64 rotate.

As previously explained, the CMG cluster configuration according to the second aspect of the present invention allows, at any time, to find and, thence, use a triplet of CMG units such that to keep the angular momentum request in a corresponding singularity-free region, thereby rendering the gimbal command calculation extremely fast and computationally light (in fact a simple 3×3 matrix inversion is required) and, at the same time, avoiding any singularity problem.

In consideration of the aforesaid technical advantages related to the second aspect of the present invention, it can be easily understood that, as already previously explained, the CMG assembly configuration according to the second aspect of the present invention allows, per se, to realize a new and inventive attitude control system (even without the additional features according to the first and third aspects of the present invention). In this respect, it is important to stress the point that the CMG assembly configuration according to the second aspect of the present invention can be advantageously exploited also in an attitude control system that:
includes CMGs with unlimited gimbal revolutions; and/or
implements a CMG assembly control logic different than the one according to the third aspect of the present invention.

Finally, as for the third aspect of the present invention, this aspect relates to a logic for controlling a CMG cluster of an attitude control system, which CMG cluster includes more than three CMG units.

In particular, the CMG cluster control logic according to the third aspect of the present invention is able to merge the characteristics of two CMG configurations, namely the configuration of the overall CMG cluster and the configuration of any CMG triplet (i.e., any combination of three CMG units) among the CMGs of the cluster. In this way, the CMG cluster control logic has at its disposal the total angular momentum of the overall CMG cluster configuration and the simple steering law of the CMG triplet configuration, thereby avoiding the use of computationally intensive algorithms.

In detail, the CMG cluster control logic according to the third aspect of the present invention is designed to control a cluster of four or more CMGs and is an adaptive, real-time logic that involves the simultaneous use of only three CMGs while the other CMG unit(s) remains/remain stationary. The selection of the active triplet is made on the basis of the angular momentum request.

Conveniently, the CMG cluster control logic according to the third aspect of the present invention is designed to control a cluster of four CMGs. In this case, the algorithm involves the simultaneous use of only three CMGs while the fourth remains stationary. The algorithm selects the "in-use" CMG units between the four available triplets in order to provide the spacecraft/satellite with the necessary angular momentum.

More conveniently, the CMG cluster control logic according to the third aspect of the present invention is designed to control a cluster of CMGs having the configuration according to the second aspect of the present invention (with at least 4 CMGs). In this case, as previously explained, each triplet has an internal singularity-free region that can be explored without encountering any singularity problem, meanwhile the stationary CMG provides an angular momentum bias disposed along a fixed direction. The singularity-free region is an ellipsoid of radii 1H, 1H, √3H.

The general law that defines the momentum ellipsoid for each triplet is the following:

$$\frac{(H_x(t) - H_x^i)^2}{a^2} + \frac{(H_y(t) - H_y^i)^2}{b^2} + \frac{(H_z(t) - H_z^i)^2}{c^2} \leq 1,$$

where $a=3H_0^2$, $b=H_0^2$ and $c=H_0^2$ for the CMG triplets CONF1 and CONF2 previously described, while $a=H_0^2$, $b=3H_0^2$ and $c=H_0^2$ for the CMG triplets CONF3 and CONF4 previously described.

Figure 7:
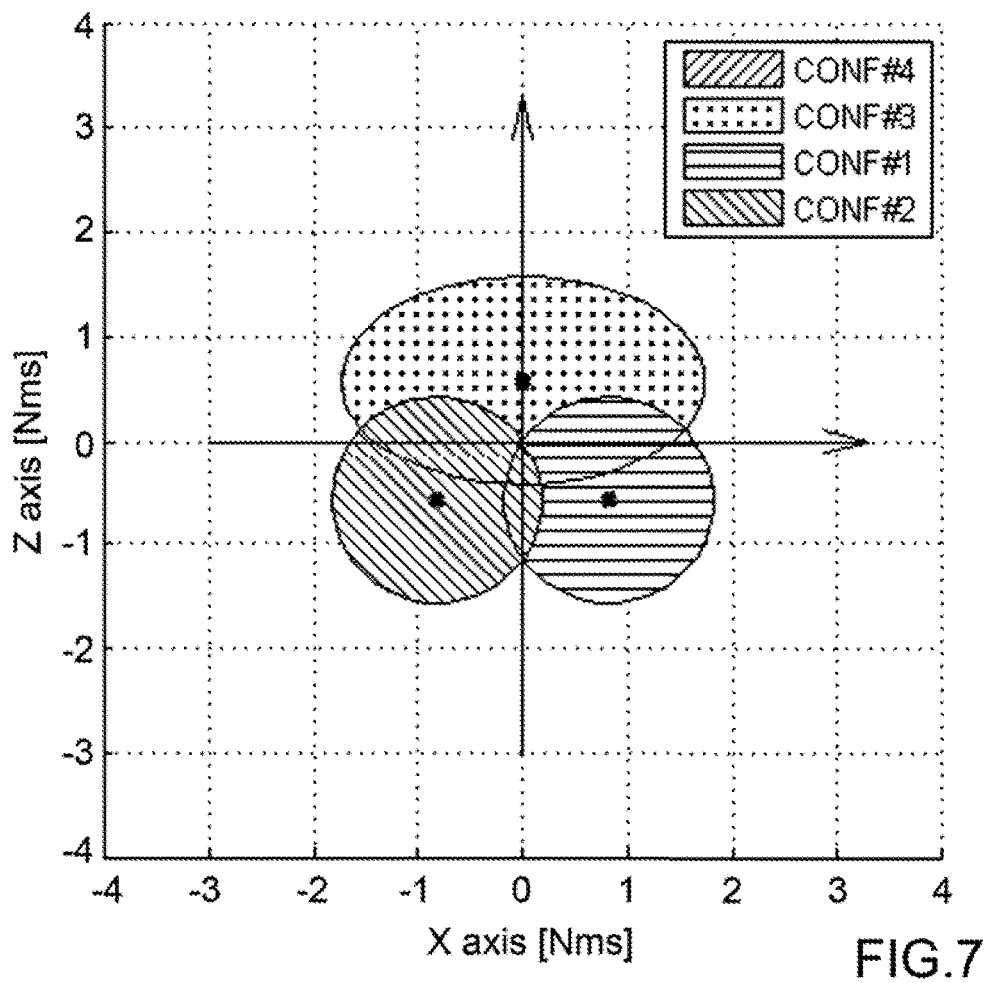
FIGS. 7-9 show, in three reference planes, an angular momentum envelope of a Control Momentum Gyroscope cluster according to a first preferred embodiment of the cluster shown in FIG. 4.
Figure 8:
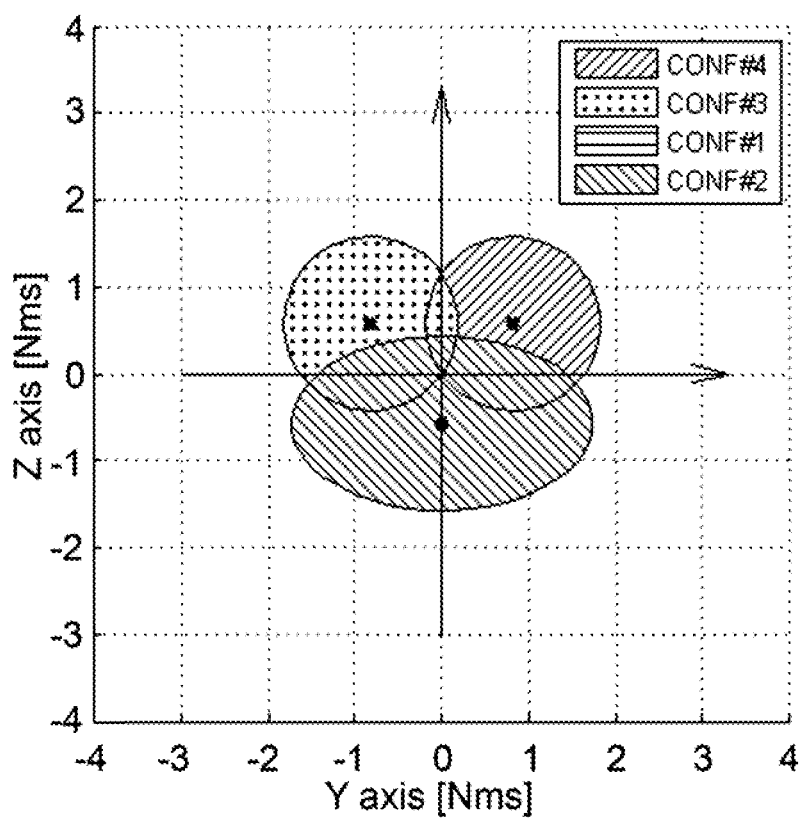
Figure 9:
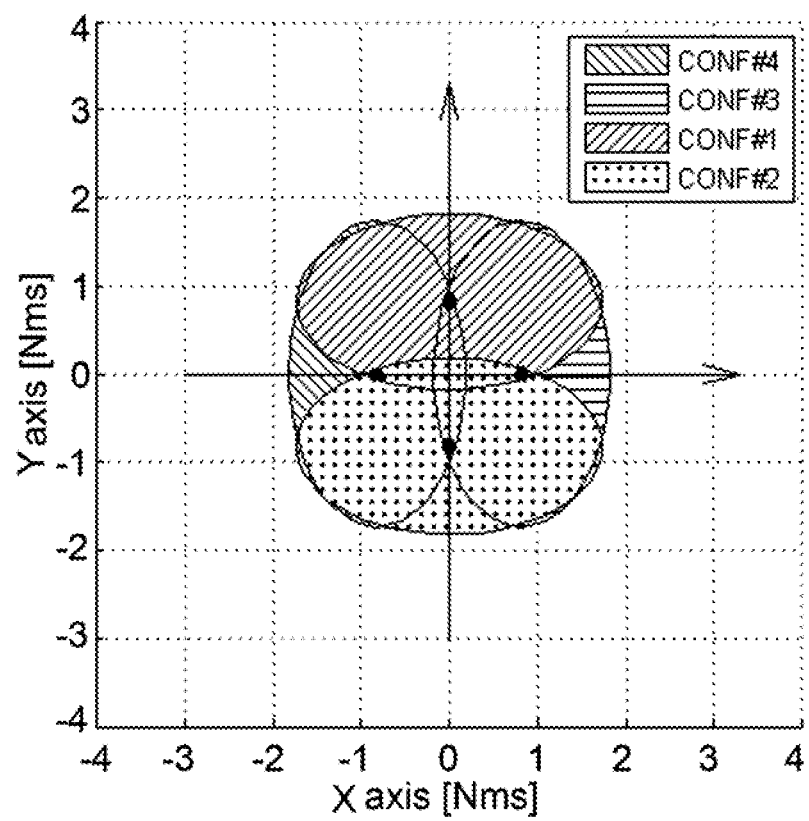
Figure 10:
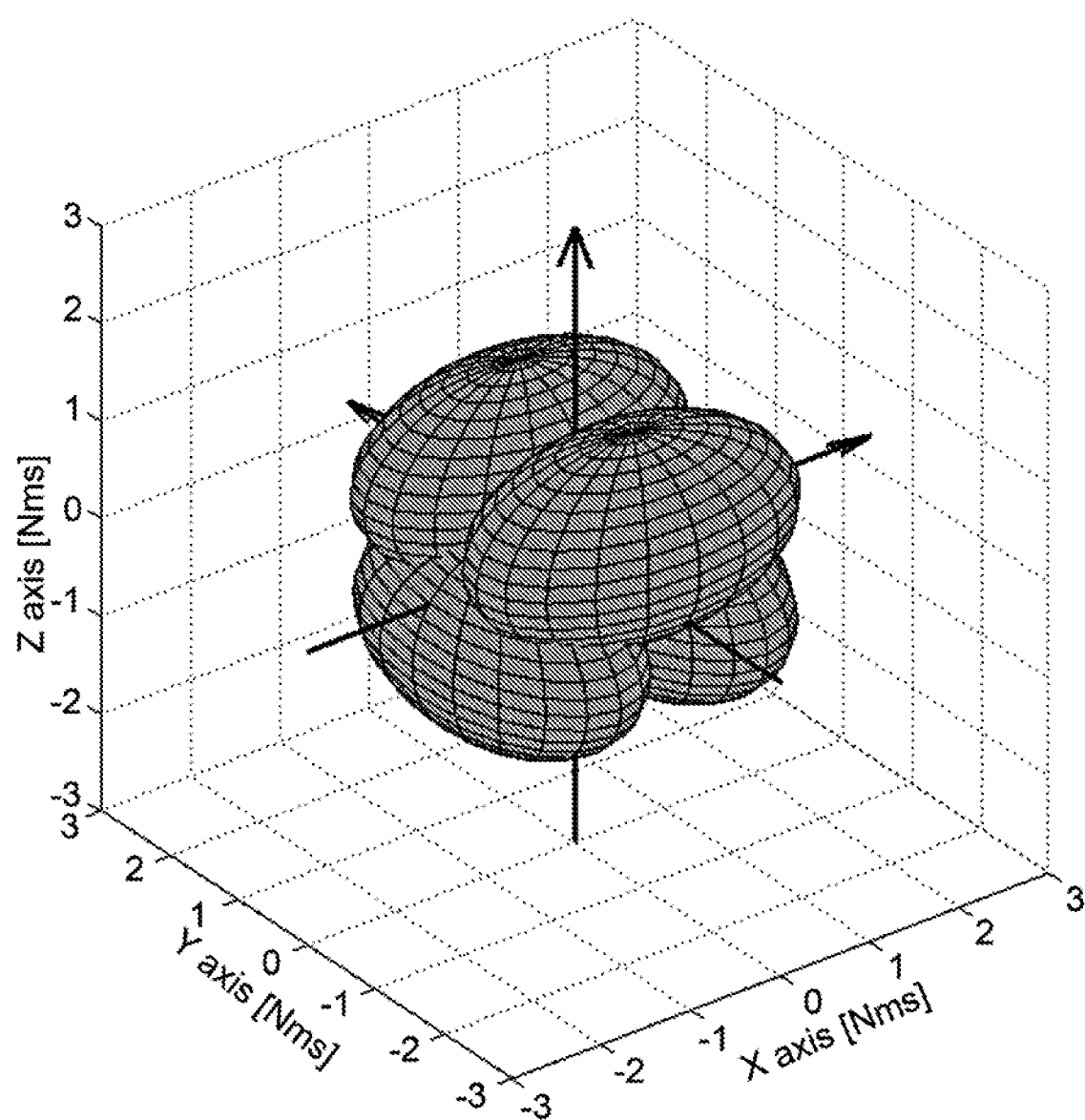
FIG. 10 shows the overall three-dimensional angular momentum envelope of the Control Momentum Gyroscope cluster according to said first preferred embodiment of the cluster shown in FIG. 4.

The composition of the four ellipsoids (corresponding to the four CMG triplets CONF1, CONF2, CONF3 and CONF4), opportunely shifted by the respectively-halted CMG, defines the angular momentum envelope of the CMG cluster. In this respect, FIGS. 7-9 show the angular momentum envelope of said CMG cluster in reference planes ZX, ZY and YX, respectively, while FIG. 10 shows the overall three-dimensional angular momentum envelope of the CMG cluster. In other words, FIGS. 7-10 show different views of the angular momentum envelope of the CMG cluster 4 for the case $\gamma_1=\gamma_2=0$ (namely, when the planes of rotation of the angular momentum vectors $H_1$ and $H_2$ of the CMGs 41 and 42 and of the angular momentum vectors $H_3$ and $H_4$ of the CMGs 43 and 44 are perpendicular).

The selection of the active triplet is made by a cluster management function on the basis of the requested attitude trajectory, since each triplet allows to explore the angular momentum envelope in a specific direction.

Figure 11:
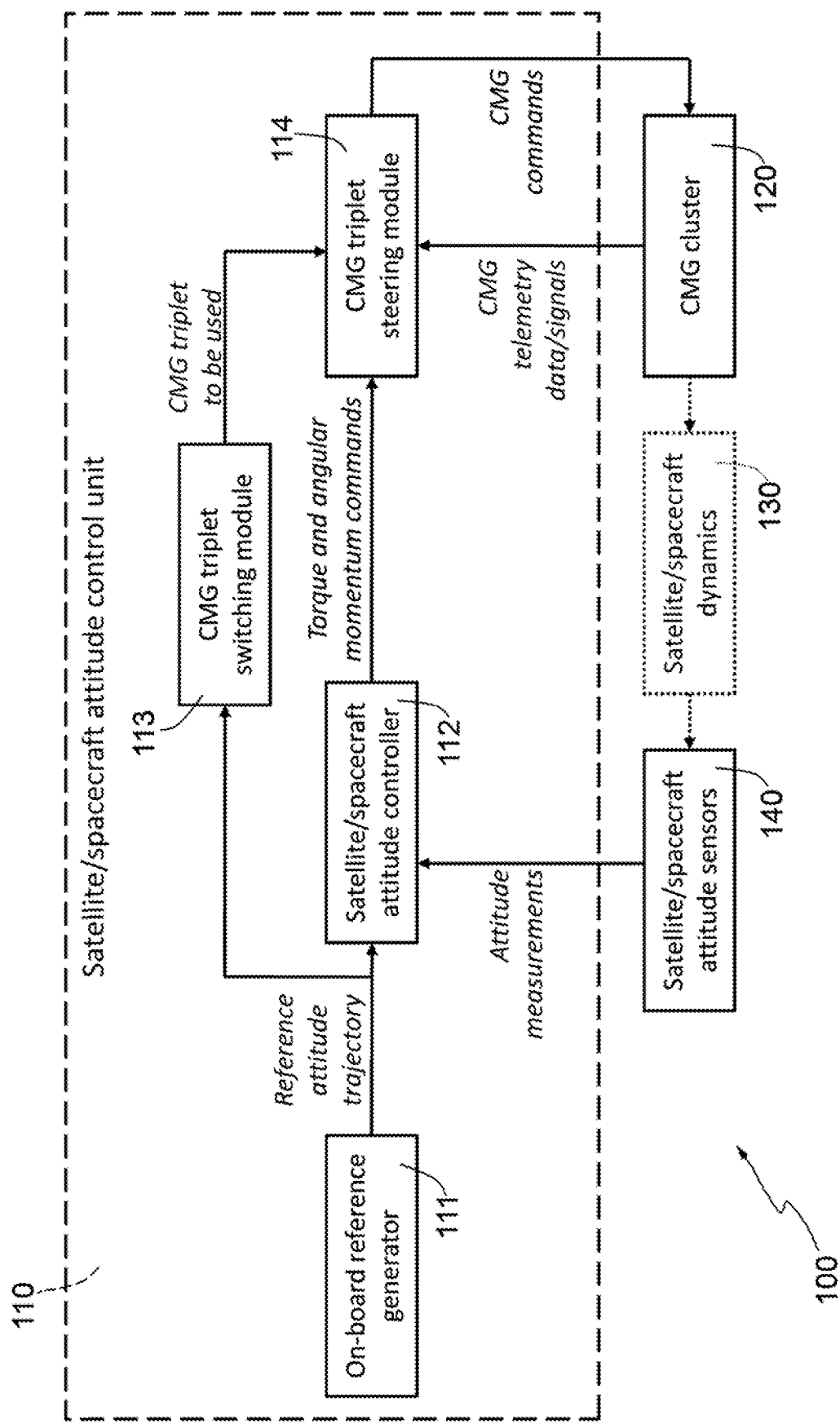
FIG. 11 schematically illustrates a satellite/spacecraft attitude control system implementing a Control Momentum Gyroscope cluster control logic according to a preferred embodiment of a third aspect of the present invention.

For a better understanding of the third aspect of the present invention, FIG. 11 shows a functional block diagram of a satellite/spacecraft attitude control system (denoted as a whole by 100) implementing a CMG cluster control logic according to a preferred embodiment of the aforesaid third aspect of the present invention.

In particular, the satellite/spacecraft attitude control system 100 shown in FIG. 11 is designed to be installed on board a satellite or spacecraft (not shown in FIG. 11 for the sake of illustration simplicity) to control its attitude (and, conveniently, also its orbit when it is necessary to reorient the satellite/spacecraft thrusters direction), and includes:
a satellite/spacecraft attitude control unit 110, which is configured (in particular, specifically programmed by means of a specific software code) to control attitude (and, conveniently, also orbit) of the satellite/spacecraft;
a CMG cluster 120, which is coupled to the satellite/spacecraft attitude control unit 110 and which includes more than three CMG units, conveniently four CMGs, more conveniently four CMGs having the cluster configuration according to the second aspect of the present invention, for example the cluster configuration shown in FIG. 4 or 6; preferably, said CMG cluster 120 includes CMGs with limited gimbal revolutions according to the first aspect of the present invention; and satellite/spacecraft attitude sensors 140 (such as star trackers and gyroscopes), which are
  configured to perform attitude-related measurements indicative of the current attitude of the satellite/spacecraft, and
  coupled also to the satellite/spacecraft attitude control unit 110 to provide the latter with data and/or signals indicative of the attitude-related measurements performed.

Moreover, a dotted block denoted by reference numeral 130 and named "satellite/spacecraft dynamics" is also shown in FIG. 11 to conceptually represent (in a manner broadly known in the satellite/spacecraft dynamics sector and, thence, well known to the satellite/spacecraft dynamics experts) the dynamic behavior of the satellite/spacecraft caused by the operation of the CMG cluster 120, whereby the satellite/spacecraft attitude sensors 140 carry out the attitude-related measurements on the basis of said dynamic behavior of the satellite/spacecraft.

In detail, the satellite/spacecraft attitude control unit 110 includes:
  an on-board reference generator 111, which is configured to produce a reference attitude trajectory;
  a satellite/spacecraft attitude controller 112, which is
    coupled to the on-board reference generator 111 to receive therefrom data and/or signals indicative of the reference attitude trajectory, which is coupled also to the satellite/spacecraft attitude sensors 140 to receive therefrom the data and/or signals indicative of the attitude-related measurements, and which is configured to
    perform a comparison between the reference attitude trajectory and the current attitude of the satellite/spacecraft indicated by the attitude-related measurements,
    compute attitude and rate (or velocity) errors on the basis of the comparison performed, and
    convert the attitude and rate errors into torque and angular momentum commands indicative of torque and angular momentum requested;
  a CMG triplet switching module 113, which is coupled to
    the on-board reference generator 111 to receive therefrom the data and/or signals indicative of the reference attitude trajectory, and which is configured to decide, i.e., to select, on the basis of the reference attitude trajectory, the CMG triplet to be used; and
  a CMG triplet steering module 114, which is
    coupled to the satellite/spacecraft attitude controller 112 to receive therefrom the torque and angular momentum commands,
    coupled also to the CMG triplet switching module 113 to receive therefrom data and/or signals indicative of the selected CMG triplet,
    coupled also to the CMG cluster 120 to receive therefrom telemetry data and/or signals indicative of the current angular positions and velocities of the gimbals of the CMGs,
    configured to compute, on the basis of the torque and angular momentum commands and of the current angular positions and velocities of the gimbals of the CMGs indicated by the telemetry data and/or signals, CMG commands indicative of specific angular positions and velocities to be assumed by the gimbals of the selected CMG triplet, and
    configured also to provide the CMG cluster 120 with the CMG commands so as to cause the gimbals of the selected CMG triplet to assume the aforesaid specific angular positions and velocities and, thence, to provide the torque and angular momentum requested.

More in detail, the CMG triplet switching is performed autonomously by the CMG triplet switching module 113 during the zero angular momentum transition; the CMG triplet selected to be used is the one maximizing the distance from the ellipsoid boundary (i.e., from the singularity regions) in the direction of the requested angular momentum variation. In use, once a command for a new maneuver is received, the CMG triplet switching module 113 selects the CMG triplet that best fits the mission needs, then at each (generic) discrete time instant k the total angular momentum requested to the selected CMG triplet is computed by the CMG triplet steering module 114 as the difference between the required angular momentum (computed by the satellite/spacecraft attitude controller 112) and the angular momentum of the halted (or stationary) CMG. In mathematical terms, it results that:

$$H^k_{TRIPLET} = H^k_{REQUESTED} - H^k_{PIVOT},$$

where $H^k_{TRIPLET}$ denotes the total angular momentum requested to the selected CMG triplet at the time instant k, $H^k_{REQUESTED}$ denotes the total angular momentum computed by the satellite/spacecraft attitude controller 112 and requested to the (whole) CMG cluster 120 at the time instant k, and $H^k_{PIVOT}$ denotes the angular momentum of the CMG which is halted at the time instant k.

Therefore, at each (generic) discrete time instant k the desired gimbal angular velocities (or rates) are computed by the CMG triplet steering module 114 by inverting the equation (2) previously presented, where the Jacobian matrix A is square and invertible. In particular, in mathematical terms, it results that:

$$\begin{cases} \dot{\theta}^k_{TRIPLET} = [A^k_{TRIPLET}]^{-1} \cdot \dfrac{(H^k_{TRIPLET} - H^{k-1}_{TRIPLET})}{\Delta t} \\ \dot{\theta}^k_{PIVOT} = 0 \end{cases},$$

where $\dot{\theta}_{TRIPLET}^k$ denotes the gimbal angular velocities requested to the selected CMG triplet at the time instant k, $\dot{\theta}_{PIVOT}^k$ denotes the null gimbal angular velocity of the CMG which is halted at the time instant k, $\Delta t$ denotes the time difference between the time instants k and k−1, and $A_{TRIPLET}^k$ denotes the square, invertible Jacobian matrix associated with the selected CMG triplet (with reference to the foregoing Table 1, $A_{TRIPLET}$ can be $A_{CON1}$, $A_{CONF2}$, $A_{CONF3}$ or $A_{CONF4}$ depending on which CMG triplet is selected among CONF1, CONF2, CONF3 and CONF4).

In these conditions the function that maps the gimbal rates into angular momentum is a diffeomorphism, since it is differentiable and it has a differentiable inverse.

It is important to note that the initial angular configuration of the gimbals can be conveniently chosen so that the total angular momentum of the CMG cluster 120 is zero; since there exist several gimbal angle values that satisfy this condition, it can be conveniently selected the gimbal angular configuration maximizing the distance from the nearest singularity configuration. In particular, this selection can be conveniently made so as to ensure that the angular momentum stored in any triplet is far enough from the singularity regions of the momentum ellipsoid (or envelope) to correctly control the environmental disturbances and controller errors.

Furthermore, with reference to the CMG cluster 4 shown in FIG. 4, the CMG cluster angular momentum envelope shape is strictly related to the tilt angle between:
the plane in which the angular momentum vectors $H_1$ and $H_2$ of the CMGs 41 and 42 rotate; and
the plane in which the angular momentum vectors $H_3$ and $H_4$ of the CMGs 43 and 44 rotate.

Figure 12:
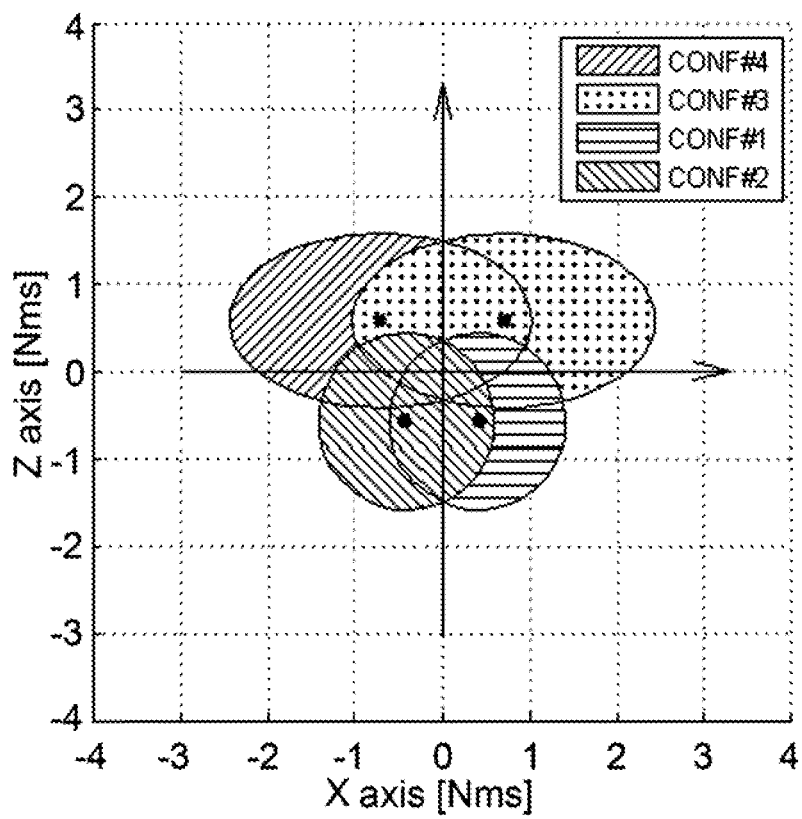
FIGS. 12-14 show, in three reference planes, an angular momentum envelope of a Control Momentum Gyroscope cluster according to a second preferred embodiment of the cluster shown in FIG. 4.
Figure 13:
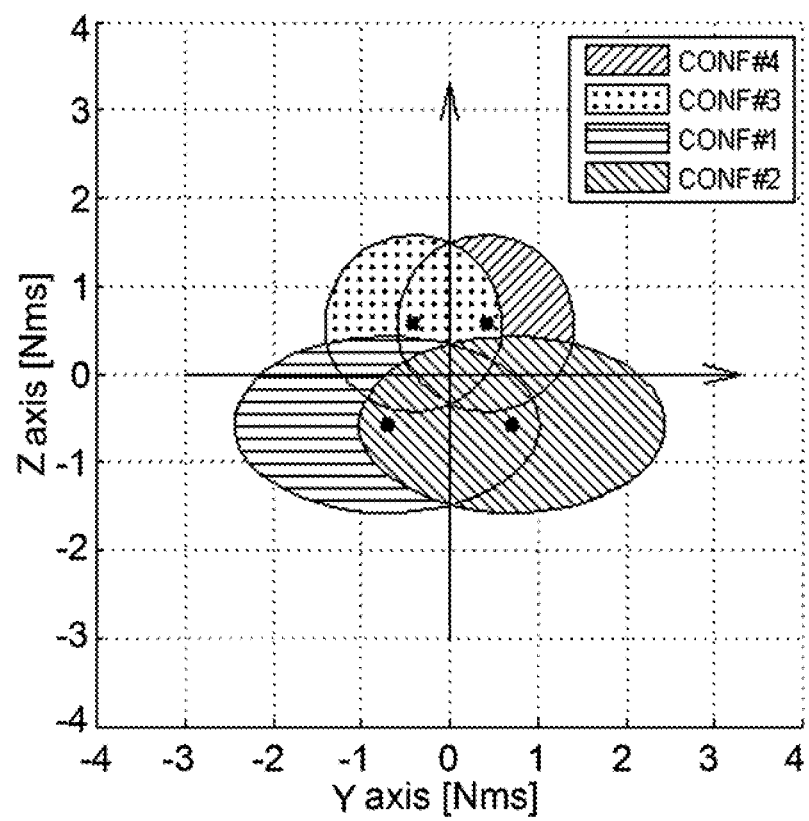
Figure 14:
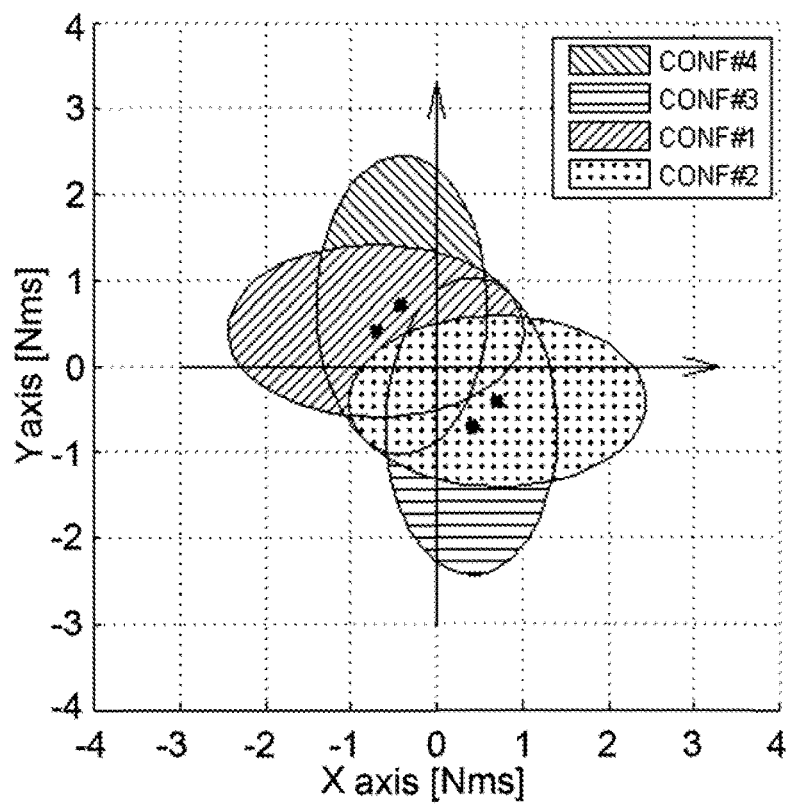

In fact, the disposition of the singularity-free ellipsoid in the angular momentum space can be varied changing said tilt angle. Therefore, this feature allows to have an additional flexibility: the system can be configured so as to reach the maximum angular momentum availability along a preferred axis or direction. In this respect, FIGS. 12-14 show the angular momentum envelope of the CMG cluster 4 in reference planes ZX, ZY and YX, respectively, in case the planes of rotation of the angular momentum vectors $H_1$ and $H_2$ of the CMGs 41 and 42 and of the angular momentum vectors $H_3$ and $H_4$ of the CMGs 43 and 44 are tilted by 45°.

Figure 15:
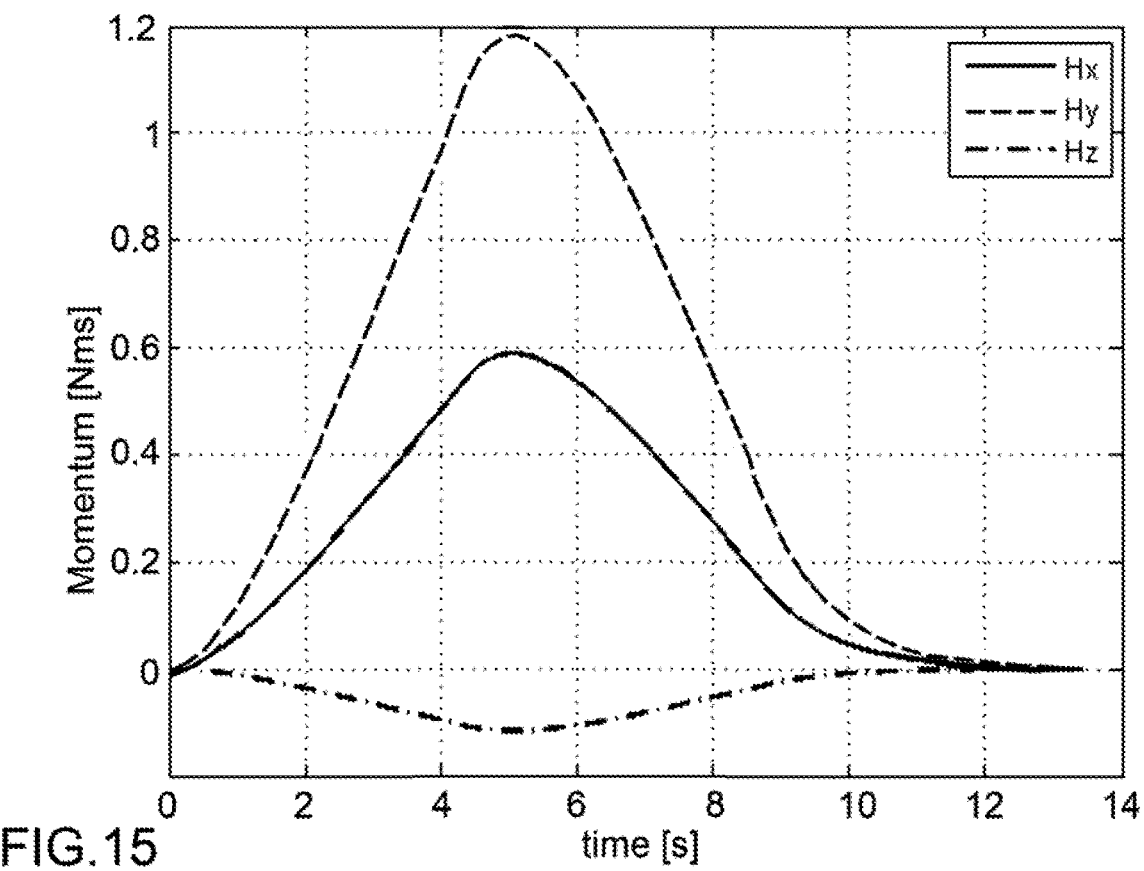
FIGS. 15 and 16 schematically illustrates results of two tests of the present invention carried out by the Applicant.
Figure 16:
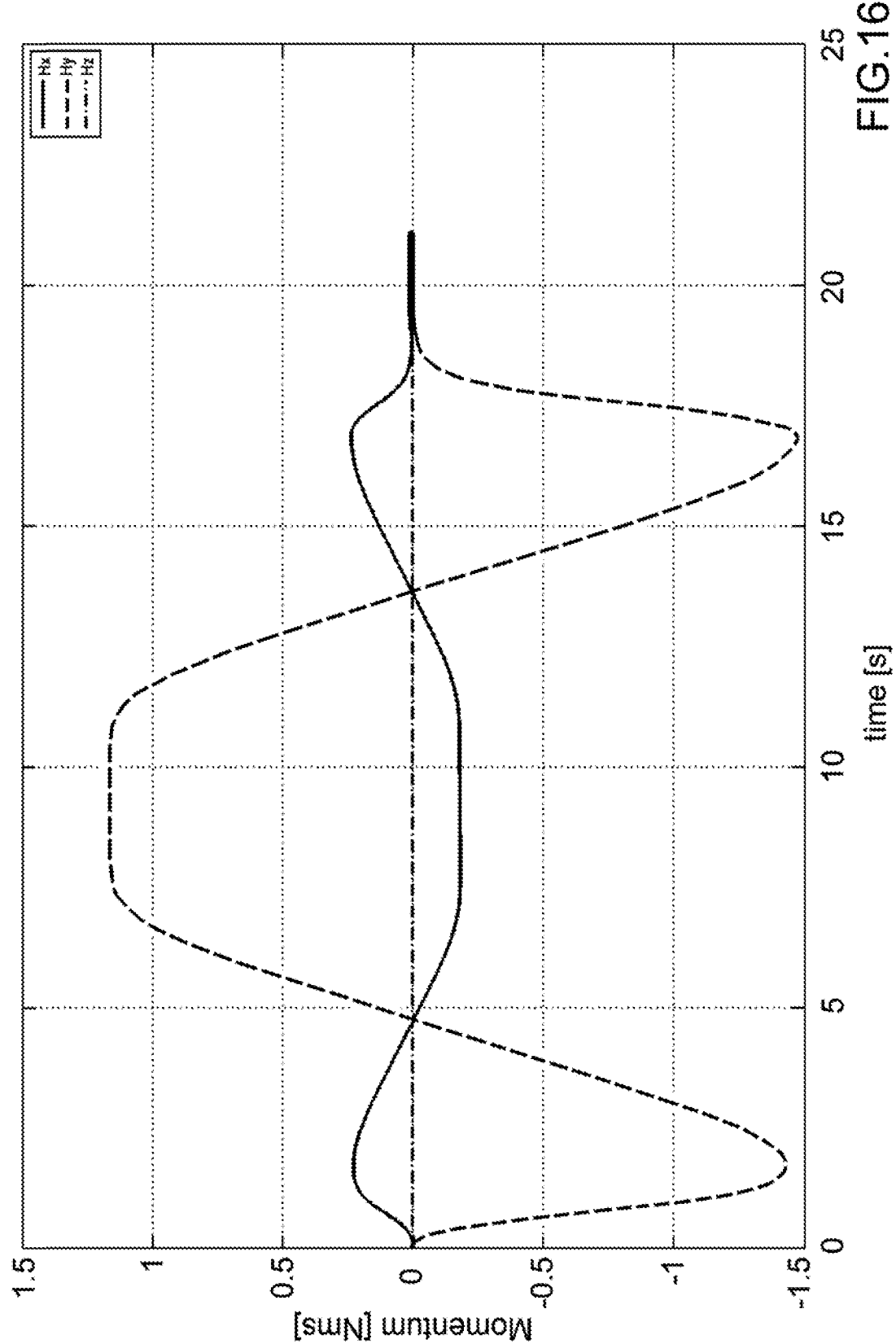

The Applicant carried out several tests of the present invention. In this respect, FIG. 15 schematically illustrates the results of a first test case carried out by the Applicant, in which a maneuver is performed mainly on the pitch axis and the angular momentum variation request is totally inside the angular momentum envelope of the CMG triplet CONF1 that is selected from the controller to perform the maneuver. Moreover, FIG. 16 schematically illustrates the results of a second test case carried out by the Applicant, in which a stereo-pair maneuver is performed and the angular momentum variation request varies from positive pitch axis to negative pitch axis and vice versa. In this second test case the selection involves the use of two different CMG triplets during the slew; the CMG triplet switching is performed autonomously by the software-implemented control logic during the zero angular momentum transition. The CMG triplet selected to be used is the one maximizing the distance from the ellipsoid boundary in the direction of the requested angular momentum variation.

The CMG assembly control logic according to the third aspect of the present invention has several advantages. In particular, as already previously explained, it assures that the angular momentum inside the internal singularity-free zone can be explored with a limited variation of the gimbal angles; this kind of guidance allows, or rather optimally matches, the use of CMGs with limited gimbal revolutions according to the first aspect of the present invention.

Moreover, said CMG assembly control logic employs a simplified steering law avoiding the use of computationally intensive algorithms; therefore it allows a software real-time implementation on board the satellite/spacecraft.

Additionally, the CMG assembly control logic according to the third aspect of the present invention assures a full satellite/spacecraft attitude controllability implementing a real-time simplified algorithm also in case of failure of a CMG.

In consideration of the aforesaid technical advantages related to the CMG assembly control logic according to the third aspect of the present invention, it can be easily understood that, as already previously explained, said aspect allows, per se, to realize a new and inventive attitude control system (even without the additional features according to the first and second aspects of the present invention). In this respect, it is important to stress the point that the CMG assembly control logic according to the third aspect of the present invention can be advantageously exploited also in an attitude control system that:
includes CMGs with unlimited gimbal revolutions; and/or
has a CMG cluster with a configuration different than the one according to the second aspect of the present invention.

In particular, the CMG triplet switching algorithm previously described can be advantageously applied also to CMG configurations different from the one according to the second aspect of the present invention and independently of the number of CMG units (provided that the CMG units are more than three).

The present invention can be advantageously exploited for satellite applications, which thus benefit from an augmented spacecraft attitude agility, in order to perform:
multi-target acquisitions on a restricted area in one and the same passage, such as in Spotlight mode, Stripmap mode, Area mode and Track following;
high resolution imaging, such as stereo-pair maneuvers in one and the same passage;
fast sun pointing acquisition;
fast re-pointing for orbital correction maneuvers and for collision avoidance; and
fast reporting for data storing and forward application.

The above acquisition scenario applies for:
Earth observation satellites equipped with active/passive radar sensors;
Earth observation satellites equipped with optical sensor (panchromatic, hyper-spectral, multi-spectral, infrared);
scientific missions; and
telecommunications satellites.

Further potential uses relate to satellite scientific missions, which require that instruments are rapidly pointed towards various parts of the sky.

Moreover, potentially the present invention can be advantageously exploited also in the robotic field; for example, a CMG "scissored" couple can be used as direct drive of robotic harms. In such a configuration rapid robotic movements do not impart low-frequency disturbances that might excite structural vibrations.

From the foregoing description the technical advantages of the present invention are immediately clear. In particular, without prejudice to the technical advantages of the single aspects of the present invention, it is important to stress the point that the synergetic combination of the aforesaid three aspects of the present invention allows to realize a new and inventive attitude control system which, in general, overcomes all the main problems related to the use of CMGs, and, in particular, has:
lower complexity and, thence, lower costs, and, at the same time, higher reliability and stability than known attitude control systems; and also
improved singularity avoidance capabilities.

As for differences between the present invention and the CMG cluster according to US 2011/011982 A1, the dynamic unbalance compensation system according to US 2003/160132 A1 and the hierarchical strategy for singularity avoidance in arrays of CMGs according to EP 1 908 686 A1, it is worth noting that none of US 2011/011982 A1, US 2003/160132 A1 and EP 1 908 686 A1 discloses the CMG assembly control logic according to the third aspect of the present invention. In particular, it is important to stress the fact that, even if US 2011/011982 A1 discloses a control architecture enabling independent control of a single CMG within an CMG array, nevertheless US 2011/011982 A1 does not teach nor suggests:

the selection, within a CMG cluster comprising four or more CMGs, of three CMGs to be simultaneously operated while keeping the unselected CMG(s) stationary; and the fact that only the three selected CMS are operated (in particular, are simultaneously operated) while keeping the unselected CMG(s) stationary.

More in general, US 2011/011982 A1 does not teach nor suggests the synergetic combination of the following steps of the CMG assembly control logic according to the third aspect of the present invention:

selecting, on the basis of a reference platform's attitude trajectory, three CMGs to be simultaneously operated while keeping the unselected CMG(s) stationary;

computing, on the basis of the reference platform's attitude trajectory and of a current platform's attitude, an overall angular momentum to be provided by the CMG assembly;

computing, on the basis of the overall angular momentum to be provided by the CMG assembly and of an angular momentum of the unselected CMG(s), a triplet-related angular momentum to be provided by the three selected CMGs; and simultaneously operating the three selected CMGs so as to cause these latter to provide said triplet-related angular momentum computed, while keeping the unselected CMG(s) stationary.

Moreover, it is worth noting that the hierarchical strategy for singularity avoidance in arrays of CMGs according to EP 1 908 686 A1 exploits null space maneuvers to avoid singularities, thereby being completely different from the CMG assembly control logic according to the third aspect of the present invention, which, on the contrary, does not use any null space maneuver.

Finally, it is important to note that none of US 2011/011982 A1, US 2003/160132 A1 and EP 1 908 686 A1 discloses the use of CMGs with limited gimbal revolutions according to the first aspect of the present invention. In this respect, it is worth noting that FIG. 6 of US 2003/160132 A1 shows CMGs that cannot rotate fully, thereby being unable even to perform one full revolution. More in general, it is important to stress the fact that none of US 2011/011982 A1, US 2003/160132 A1 and EP 1 908 686 A1 teaches or suggests the use of a flexible cable mechanically limiting the number of full revolutions performable clockwise and counterclockwise by the gimbal of a CMG.

In conclusion, it is clear that numerous modifications and variants can be made to the present invention, all falling within the scope of the invention, as defined in the appended claims.

The invention claimed is:

1. An attitude control unit (110), which is designed to be:
installed on a platform to control the attitude of the platform; and
coupled to a Control Moment Gyroscope assembly (4,6, 120), that is installed on board said platform and comprises four or more Control Moment Gyroscopes (3,41,42,43,44,61,62,63,64);
said attitude control unit (110) being configured to:
select, on the basis of a reference attitude trajectory of the platform, three Control Moment Gyroscopes (3,41,42, 43,44,61,62,63,64) to be simultaneously operated while keeping the unselected Control Moment Gyroscope(s) (3,41,42,43,44,61,62,63,64) stationary;

compute, on the basis of the reference attitude trajectory and of a current attitude of the platform, an overall angular momentum to be provided by the Control Moment Gyroscope assembly (4,6,120);

compute, on the basis of the overall angular momentum to be provided by the Control Moment Gyroscope assembly (4,6,120) and of an angular momentum of the unselected Control Moment Gyroscope(s) (3,41,42,43, 44,61,62,63,64), a triplet-related angular momentum to be provided by the three selected Control Moment Gyroscopes (3,41,42,43,44,61,62,63,64); and simultaneously operate the three selected Control Moment Gyroscopes (3,41,42,43,44,61,62,63,64) so as to cause these latter to provide said triplet-related angular momentum computed, while keeping the unselected Control Moment Gyroscope(s) (3,41,42,43,44, 61,62,63,64) stationary.

2. The attitude control unit (110) of claim 1, wherein the attitude control unit (110) is further configured to:

compute, on the basis of the triplet-related angular momentum computed and of current angular positions and velocities of gimbals (32) of the three selected Control Moment Gyroscopes (3,41,42,43,44,61,62,63, 64), new angular positions and velocities to be assumed by the gimbals (32) of said three selected Control Moment Gyroscopes (3,41,42,43,44,61,62,63,64) such that these latter provide said triplet-related angular momentum computed; and simultaneously operate the gimbals (32) of the three selected Control Moment Gyroscopes (3,41,42,43,44, 61,62,63,64) so as to cause said gimbals (32) to assume the new angular positions and velocities computed, thereby causing said three selected Control Moment Gyroscopes (3,41,42,43,44,61,62,63,64) to provide the triplet-related angular momentum computed.

3. The attitude control unit (110) of claim 1, wherein the Control Moment Gyroscopes include first Control Moment Gyroscopes (41,42; 61,62) and second Control Moment Gyroscopes (43,44; 63,64);
and wherein:
the first Control Moment Gyroscopes (41,42; 61,62) have gimbal axes that are parallel or lie along one and the same straight line;
the first Control Moment Gyroscopes (41,42; 61,62) have angular momentum vectors rotatable in one and the same plane or in parallel planes;
the second Control Moment Gyroscopes (43,44; 63,64) have gimbal axes that
(i) are parallel or lie along one and the same straight line, and
(ii) are not parallel to the gimbal axes of the first Control Moment Gyroscopes (41,42; 61,62);
the second Control Moment Gyroscopes (43,44; 63,64) have angular momentum vectors rotatable in one and the same plane or in parallel planes; and
the plane(s) in which the angular momentum vectors of the first Control Moment Gyroscopes (41,42; 61,62) are rotatable intersects/intersect the plane(s) in which the angular momentum vectors of the second Control Moment Gyroscopes (43,44; 63,64) are rotatable.

4. The attitude control unit (110) of claim 3, wherein:
the gimbal axes of the first Control Moment Gyroscopes (41,42) are parallel;
the angular momentum vectors of the first Control Moment Gyroscopes (41,42) are rotatable in one and the same plane;

the gimbal axes of the second Control Moment Gyroscopes (43,44) are parallel and lie on the same plane of the gimbal axes of the first Control Moment Gyroscopes (41,42);

the angular momentum vectors of the second Control Moment Gyroscopes (43,44) are rotatable in one and the same plane that intersects the plane in which the angular momentum vectors of the first Control Moment Gyroscopes (41,42) are rotatable; and the plane in which the angular momentum vectors of the first Control Moment Gyroscopes (41,42) are rotatable is perpendicular to, or tilted with respect to, the plane in which the angular momentum vectors of the second Control Moment Gyroscopes (43,44) are rotatable.

5. The attitude control unit (110) of claim 3, wherein:

the gimbal axes of the first Control Moment Gyroscopes (61,62) lie along one and the same straight line;

the angular momentum vectors of the first Control Moment Gyroscopes (61,62) are rotatable in parallel planes;

the gimbal axes of the second Control Moment Gyroscopes (63,64) lie along one and the same straight line that is perpendicular to the straight line along which the gimbal axes of the first Control Moment Gyroscopes (61,62) lie; and the angular momentum vectors of the second Control Moment Gyroscopes (63,64) are rotatable in parallel planes that are are perpendicular to the planes in which the angular momentum vectors of the first Control Moment Gyroscopes (61,62) are rotatable.

6. A space platform equipped with the attitude control unit (100) of claim 1.

7. The space platform of claim 6, wherein said space platform is a satellite or a spacecraft.

8. A Control Moment Gyroscope assembly, comprising the attitude control unit (100) of claim 1, wherein the attitude control unit is installed on the platform to control the attitude of the platform.

9. The Control Moment Gyroscope assembly (4,6,120) of claim 8, wherein each Control Moment Gyroscope (3,41, 42,43,44,61,62,63,64) has a respective gimbal (32) that is mechanically constrained so as to be operable to perform a limited number of full revolutions on a respective gimbal axis.

10. The Control Moment Gyroscope assembly of claim 9, wherein each Control Moment Gyroscope (3,41,42,43,44, 61,62,63,64) is equipped with respective sensors and is coupled to a respective flexible cable (33) to receive therethrough power supply and to provide therethrough signals from the respective sensors; and wherein each Control Moment Gyroscope (3,41,42,43,44,61,62,63,64) is coupled to the respective flexible cable (33) so that rotation of the respective gimbal (32) causes said respective flexible cable (33) to be rolled and unrolled round said respective gimbal (32) thereby mechanically limiting the number of full revolutions performable clockwise and counterclockwise by the latter.

11. The Control Moment Gyroscope assembly of claim 10, wherein each Control Moment Gyroscope (3,41,42,43, 44,61,62,63,64) includes:

a respective casing (31); and a flywheel housed inside said respective casing (31) and operable by a respective flywheel motor to spin on a respective flywheel axis, said respective flywheel motor and said respective sensors being arranged inside said respective casing (31);

and wherein the respective gimbal (32) of each Control Moment Gyroscope (3,41,42,43,44,61,62,63,64) is coupled, externally to the respective casing (31), to said respective flexible cable (33) to receive therethrough power supply for the respective flywheel motor and to provide therethrough signals from the respective sensors.

12. The Control Moment Gyroscope assembly of claim 8, and wherein said attitude control unit (100) is coupled to said Control Moment Gyroscope assembly (4, 6, 120) to control operation thereof.

\* \* \* \* \*